United States Patent [19]

Anderson

[11] 4,042,351
[45] Aug. 16, 1977

[54] LIQUID DEGASIFIER SYSTEM AND METHOD

[75] Inventor: Robert L. Anderson, Boulder, Colo.
[73] Assignee: Halbert (NMI) Fischel, Encino, Calif.
[21] Appl. No.: 653,229
[22] Filed: Jan. 28, 1976
[51] Int. Cl.² .............................................. B01D 19/00
[52] U.S. Cl. .......................................... 55/52; 55/55; 55/184; 55/191
[58] Field of Search ....................... 55/52, 55, 88, 182, 55/184, 189, 190, 191, 203, 207

[56] References Cited

U.S. PATENT DOCUMENTS

| | | | |
|---|---|---|---|
| 1,994,110 | 3/1935 | Pittman | 55/184 |
| 2,216,542 | 10/1940 | Paige | 55/52 X |
| 2,364,119 | 12/1944 | Anderson | 55/182 |
| 2,940,657 | 6/1960 | Adams | 55/88 X |
| 3,017,951 | 1/1962 | Wiley | 55/52 |
| 3,529,405 | 9/1970 | Ashbrook | 55/191 |
| 3,810,347 | 5/1974 | Kartinen | 55/52 X |

Primary Examiner—Thomas G. Wyse
Assistant Examiner—Robert H. Spitzer
Attorney, Agent, or Firm—Fraser and Bogucki

[57] ABSTRACT

A system for continuously removing gases from a liquid initially subjects the liquid to a pressure drop and then injects the liquid into a toroidal chamber in which it is impelled into a hollow annular flow path of high surface area and velocity. The liquid is forced helically about the annulus to create internal cavitation, and entrained and dissolved gases are removed both during injection and cavitation by a suction vent at an interior region of the toroidal flow chamber. Liquid is ejected from the periphery of the toroidal chamber into the bottom of a settling chamber, also maintained under vacuum, such that gases rise to another suction vent at the top of the chamber. Degassed liquid in the settling chamber moves under gravity into the orbit of an adjacent centrifugal pump and is continuously fed out from the system into ambient pressure by a positive drive pump. In an advantageous exemplification of the invention, a toroidal flow impeller and centrifugal pump are mounted in adjacent relation on a common magnetically driven shaft from a coaxial motor which also drives a suction pump for the system.

23 Claims, 7 Drawing Figures

LIQUID DEGASIFIER SYSTEM AND METHOD

BACKGROUND OF THE INVENTION

The problem of degassing a liquid prior to some processing operation is well known, particularly in clinical procedures, scientific determinations, industrial processes and artificial organs. In a dialysis machine, for example, contained gases within a liquid, typically tap water, may have to be reduced to approximately 1 ppm or less, in order for dialysis functions to be properly effected. The gas (air) that is present in the tap water is present either as entrained gas (micro- or macro-bubbles) or dissolved gas. A liquid can contain an amount of gas, under equilibrium conditions, that is limited by both temperature and pressure. The lower the temperature and the higher the pressure the greater the amount of dissolved gas. In theory, therefore, simply increasing the temperature while reducing the pressure to suitable levels and allowing equilibrium to be reached would enable suitable degasification of the liquid. However, typical processes involve much shorter residence times than are available to achieve equilibrium.

It is known in the prior art to desgasify by inducing turbulence sufficient to create cavitation in the liquid, while maintaining a hard vacuum or at least a negative pressure within the volume in which the liquid is confined. Most of the known processes and machines are, however, batch-type systems, because significant difficulties are encountered in continuous degasifying to a low gas concentration level. It is extremely difficult, for example, to insure that the output effluent is constantly and uniformly degassed to below 1 ppm, and it is further difficult to provide positive fluid flow when working against a hard vacuum. Cost and reliability considerations prevent practical usage of an extended series of stages, pumps and interconnection controls.

Among the various techniques that have been used in the prior art to reduce the time required to reach equilibrium under given temperature and pressure conditions, it is of course known to use a combination of temperature and pressure reduction greatly in excess of that needed for a given degasification level, so that there need not be a full wait for equilibrium. However, this technique is not suitable for achieving low gas concentrations and is based upon use of an over-design, which inherently involves higher costs. It is also known to reduce the diffusion distance for the gas within a liquid, by increasing the surface area-to-volume relationship of the liquid, as by creating a falling sheet or film of liquid or the cavitation technique previously mentioned. These approaches have heretofore been limited in throughput, and have required costly or delicate equipment. A variation of this technique involves insertion of an abundance of nucleation sites, such as sharp elements, which reduce the diffusion distance of the gas through the liquid. Considering all of these techniques, however, it still has not heretofore been feasible to provide a continuously operating, relatively low cost and highly reliable degasifier capable of achieving low gas concentration levels in the liquid.

SUMMARY OF THE INVENTION

Systems and methods in accordance with the invention continuously degasify a liquid flow by centrifugally impelling the flow from an inlet into a high surface area vortex having a hollow annular or toroidal geometry and drawing a vacuum in a central region relative to the annulus to provide initial removal of contained gases. Liquid is then forced from the periphery of the toroid into the bottom of a settling chamber, also maintained under vacuum, and contained gases which had been separated by cavitation within the toroidal flow and trapped to some degree within the vortex of the toroid, rise to the top of the settling chamber and are withdrawn at the suction outlet. The degassed liquid is gravity fed from an intermediate level in the settling chamber to a centrifugal pump which operates under low pressure against the vacuum to force the fully degasified liquid into a positive displacement pump which provides effluent from the system at ambient pressure.

In a particular example of a system in accordance with the invention, a settling chamber, centrifugal pump and toroidal chamber are disposed in side-by-side relation along the horizontal axis, together with an adjacent, magnetically coupled drive and pumping system. The system is compact, easily fabricated and automatically controls the flow rate. The level of liquid in the settling chamber controls the position of a float control valve which allows inlet flow of variable amount to be injected as a spray of incoming liquid into a manifold. Entrained gases in the spray are concurrently exhausted from an evacuated toroidal chamber, as the liquid is moved within the toroidal chamber under the action of a rotating impeller into a high velocity, high surface area helical vortex motion. The impeller is coaxial about a central drive shaft and mounted in back-to-back relation with an adjacent centrifugal pump interposed between the toroidal chamber and the settling chamber in the in-line housing. Liquid at the periphery of the toroidal chamber is forced into the bottom of the settling chamber at a region well separated from the centrifugal pump, so that entrained gases are separated in the settling chamber. Degassed liquid at the centrifugal pump side of the chamber flows directly into the centrifugal pump chamber and sufficient velocity is imparted to enable the fluid to be pumped back up to ambient pressure by a coupled positive gear drive pump. A valving system in the input and outlet lines protects against loss of suction, while controllably recirculating the outlet flow in response to a pressure regulator. A double-ended drive motor is mounted coaxial with and magnetically coupled to the drive shaft for the centrifugal pump and impeller at one end, and at its opposite end is magnetically coupled to the suction pump for the system. Liquid is conducted through conduits in the housing walls between the different chambers. The configuration provides an extremely compact, highly efficient and continuously operating degasifier which, in a practical example, reduces gas concentration in heated water for a dialysate system to less than 1 ppm.

BRIEF DESCRIPTION OF THE DRAWINGS

A better understanding of the invention may be had by reference to the following description, taken in conjunction with the accompanying drawings, in which:

FIG. 6 is a fragmentary sectional view taken along the lines 6—6 in FIG. 4 and looking in the direction of the appended arrows; and FIG. 7 is a fragmentary sectional view taken along the lines 7—7 in FIG. 5 and looking in the direction of the appended arrows.

DETAILED DESCRIPTION OF THE INVENTION

Figure 1:
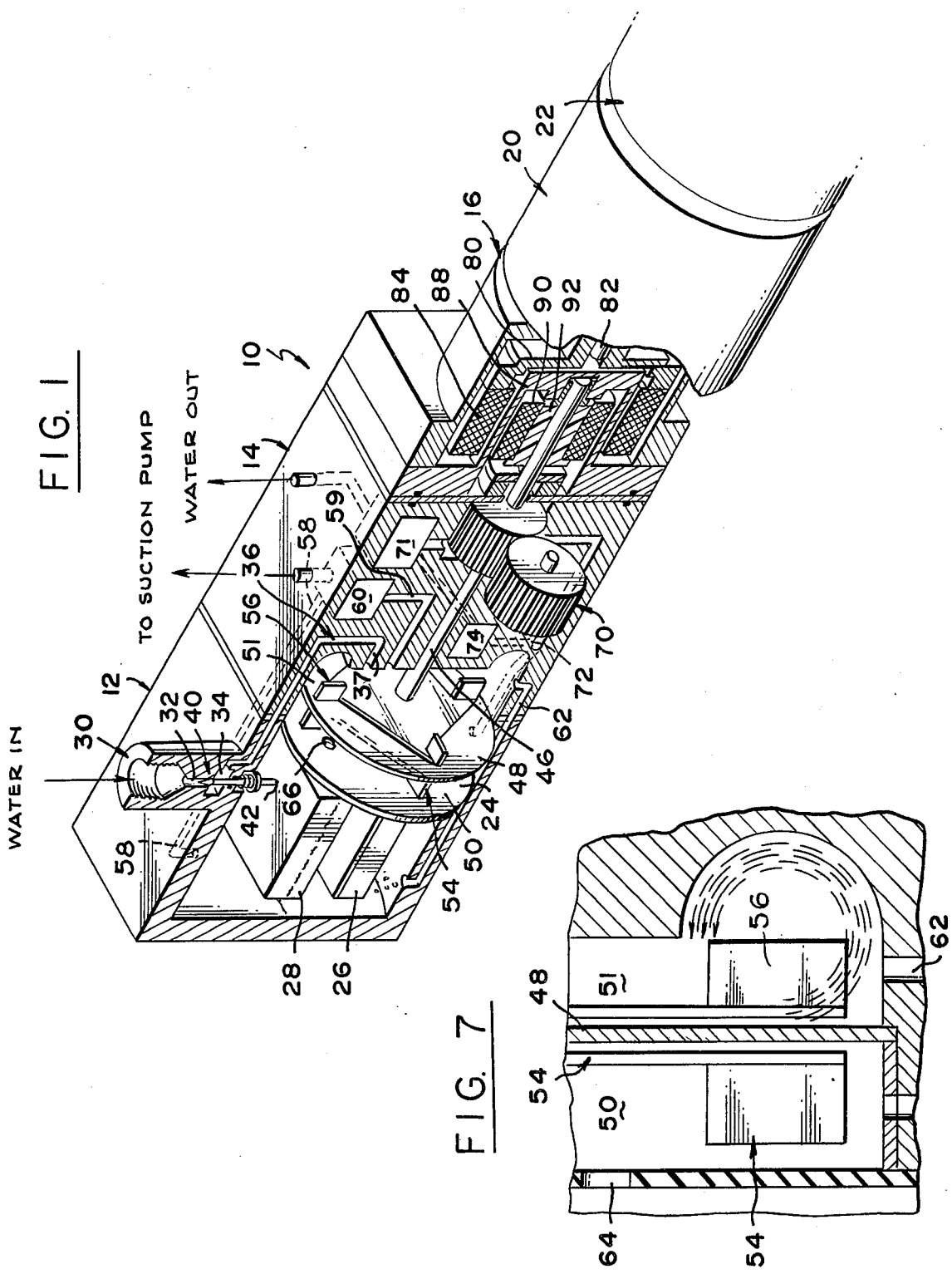
FIG. 1 is a combined block diagram and side sectional view of a degasifier system in accordance with the invention.
Figure 2:
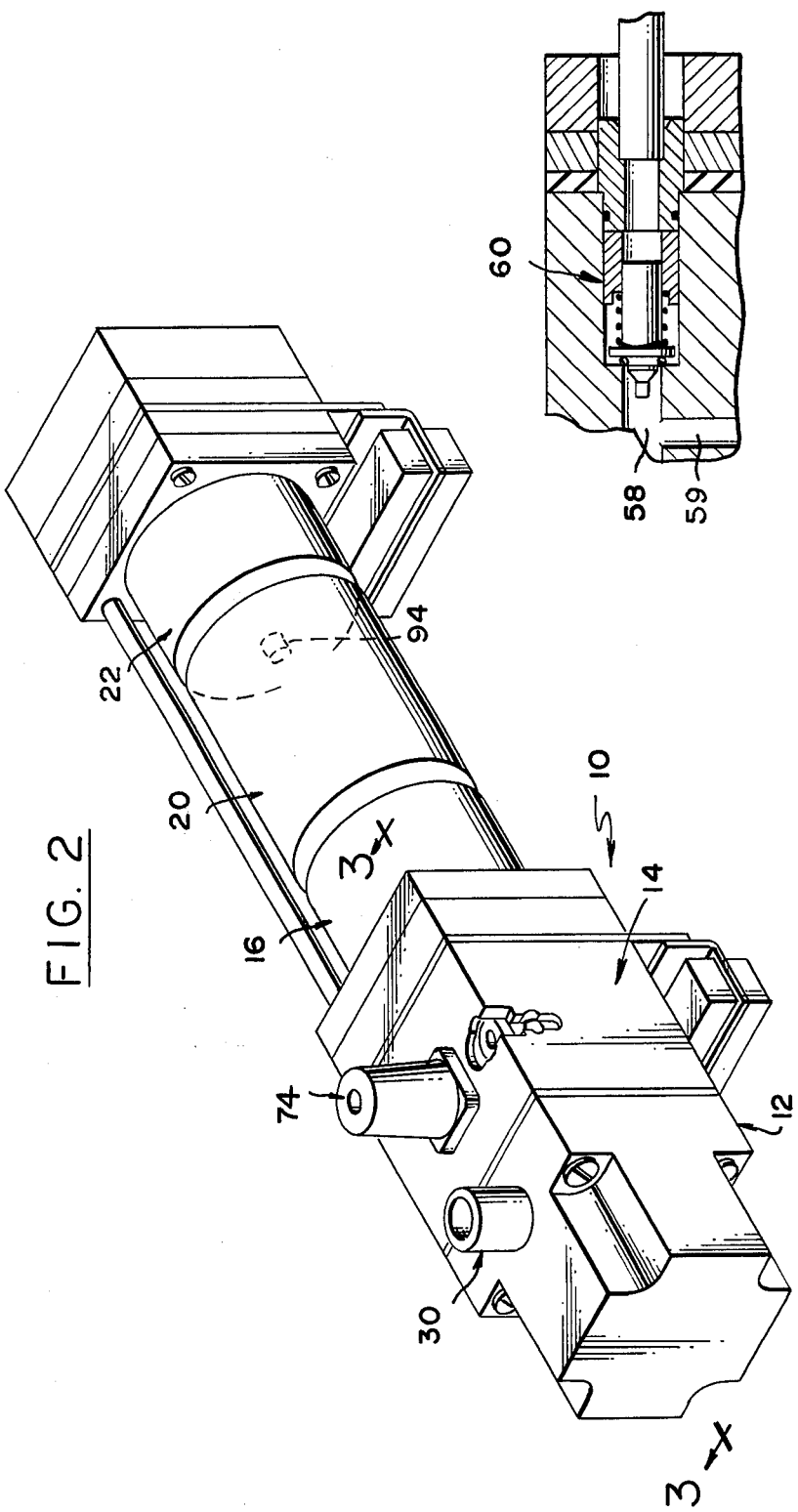
FIG. 2 is a perspective view of a portion of the system of FIG. 1, showing the toroidal chamber, settling chamber and centrifugal pump in further detail.
Figure 3:
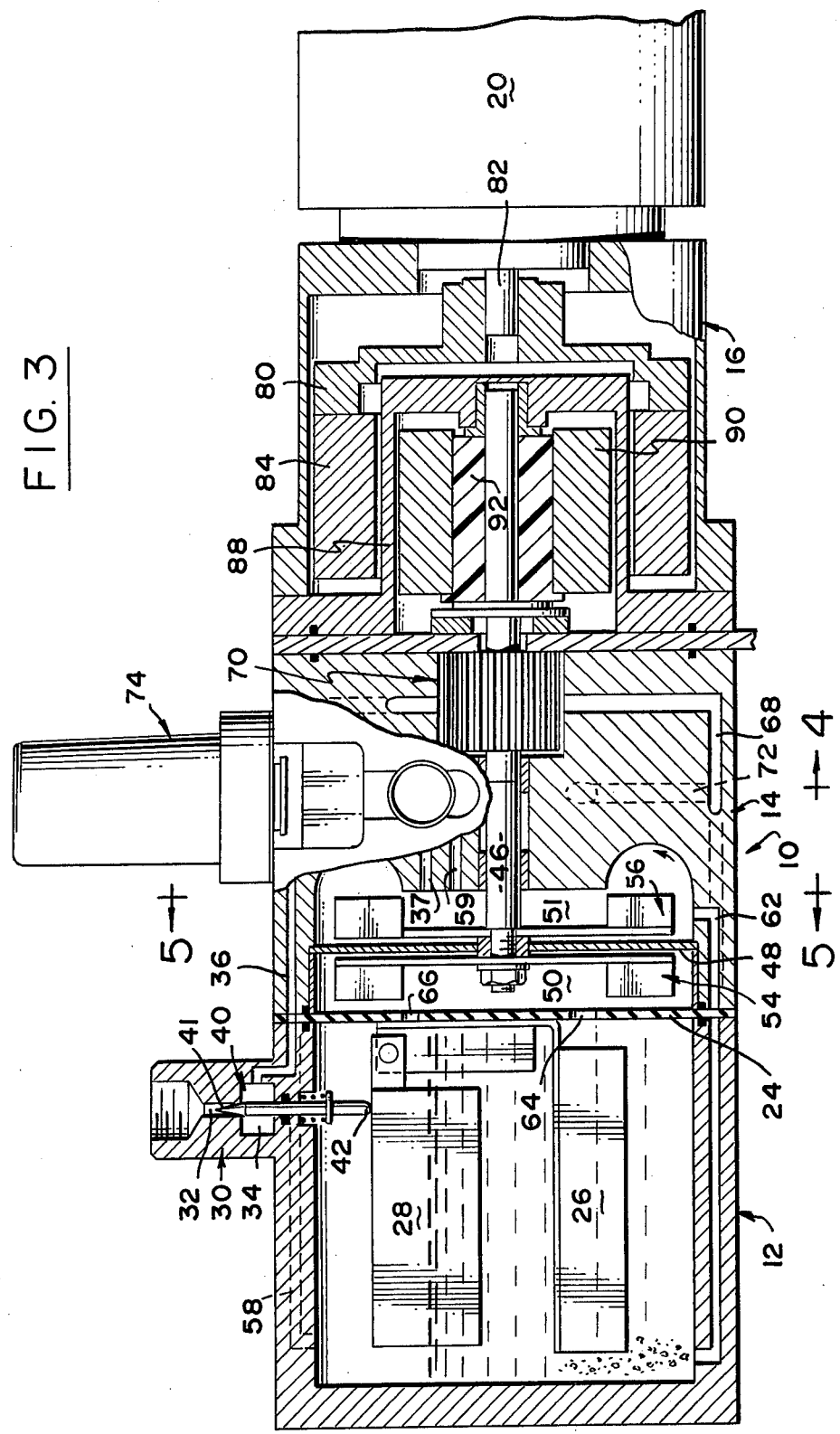
FIG. 3 is a side sectional view of a portion of the arrangement of FIG. 1, showing further details.
Figure 4:
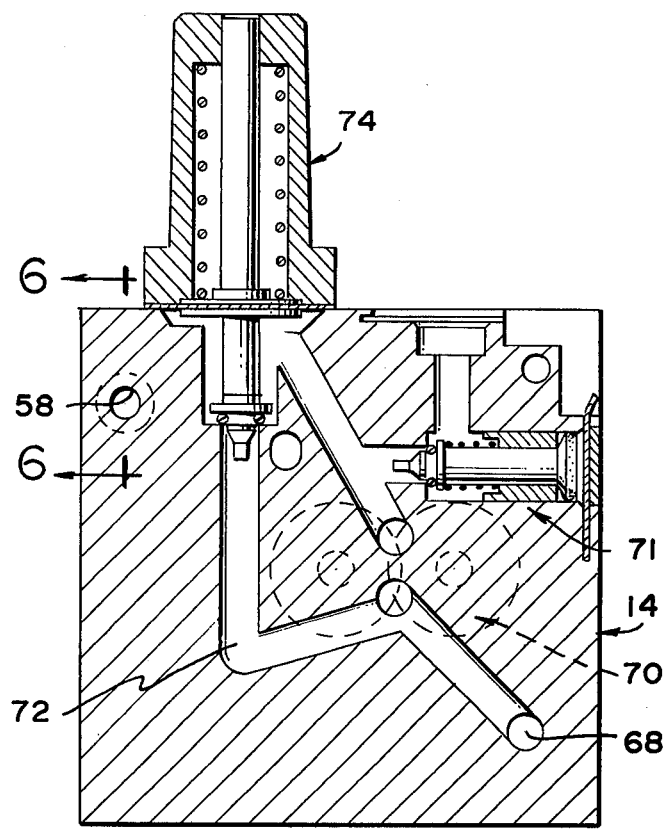
FIG. 4 is an end sectional view taken along the lines 4—4 in FIG. 3, showing further details of the conduit system therein.
Figure 5:
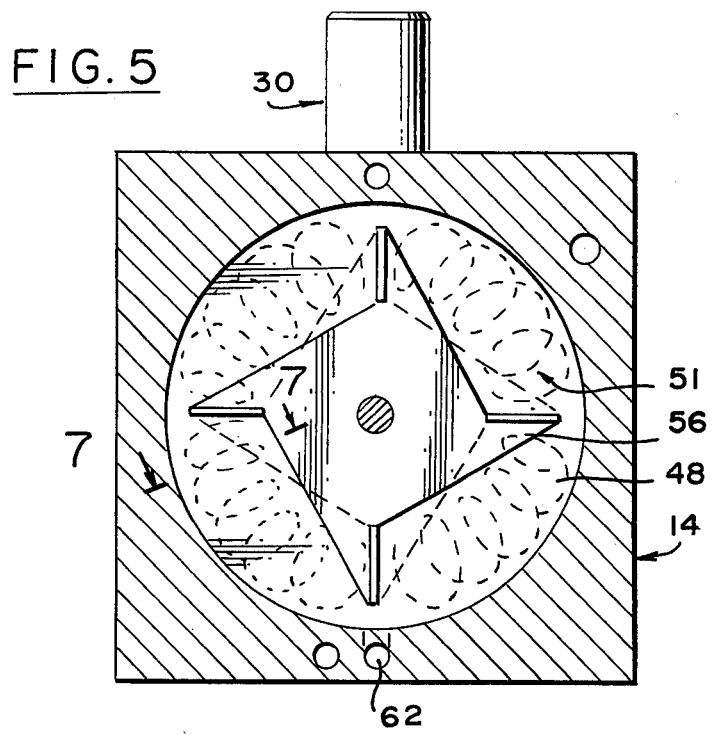
FIG. 5 is a fragmentary sectional view taken along the lines 5—5 in FIG. 3 and looking in the direction of the appended arrows.

In a degasifier system in accordance with the invention, referring now to FIGS. 1-3, the principal fluid handling components are disposed within a housing 10 conveniently divided into three serially aligned and adjacent sections, namely a settling chamber housing 12, a toroidal chamber housing 14, and a drive housing 16. A double-ended motor 20, in this example an AC motor which rotates at 1725 rpm in response to 60 cycle excitation, is adjacent to and coaxial with the drive housing 16. At its opposite end the associated motor 20 shaft is coupled to drive a suction pump 22, shown only generally.

The settling chamber housing 12 has a hollow interior, bounded on the side adjacent the toroidal chamber housing 14 by a divider wall 24, to which a lower horizontal baffle plate 26 and an upper pivotable float valve 28 are coupled. The baffle plate 26 extends laterally across a substantial area of the settling chamber interior, while the float valve 28 has a nominal position, as shown, at the desired liquid level within the chamber 12. Heated intake water is supplied at a controllable rate via an inlet housing 30 having an inlet throat section 32 leading into a manifold 34 from which a conduit 36 leads through joined walls of the housings 12,14 into an interior aperture 37 relative to the central axis within the toroidal chamber housing 14. At the throat section 32 the inlet conduit is variably blocked by the tapered tip 41 of an elongated valve member 40, the opposite end 42 of which engages and is positionally controlled by the pivot position of the float valve 28 within the settling chamber housing 12. The height of the water in the settling chamber thus determines the degree of closure at the throat section 32 and the rate of flow of inlet water.

A central shaft 46 extends along the central axis from the toroidal chamber housing 14 to the drive housing 16, being mounted on spaced-apart bearings (not shown in detail) and having a free end adjacent the settling chamber 12. The drive shaft 46 lies partially within a volume in the toroidal chamber housing 14 that is separated by a central divider wall 48 into two separate chambers 50, 51. A relatively narrow cylindrical pump chamber 50 at the terminus of the shaft 46 contains a four-bladed centrifugal pump 54 coupled to the free end of the shaft 46, and is adjacent the wall 24 at the end of the settling chamber housing 12. A spaced apart four-bladed impeller 56 similar to the pump 54 but used for a different purpose is disposed on the opposite side of the divider wall 48 and within a toroidal chamber 51, the outer periphery of which is annular in configuration. Suction conduits 58, 59 couple the suction pump 22 into the upper interior of the settling chamber volume and the central interior region of the toroidal chamber 51 respectively. These suction conduits 58, 59 draw down a vacuum of approximately 28 inches of mercury within the associated chambers. A one-way valve 60 is disposed in the line to the suction pump 22, so as to limit loss of vacuum on power shutoff.

A liquid conduit 62 connects from the outer periphery at the bottom of the toroidal chamber 51 into the bottom of the settling chamber within the housing 12 adjacent the far end of the baffle plate 26 therein relative to the wall 24. An interconnecting flow aperture 64 is disposed in the wall 24 between the settling chamber and the pump chamber 50, in the region of the level of the baffle plate 26 and well below the nominal level of the float valve 28. Above the nominal float valve level is disposed a suction aperture 66 also interconnected into the pump chamber 50. An interior liquid flow conduit connects from the periphery of the pump chamber 50, at its bottom portion, into a gear pump 70 mounted in the opposite end of the toroidal chamber housing 14 adjacent the drive housing 16. Degassed liquid is fed out from the system through a one-way valve 71 but to limit the output pressure a recirculation conduit 72 returns liquid to the inlet side of the pump 70 through a pressure relief valve 74.

Within the drive housing 16, a spider 80 coupled to the shaft 82 of the motor 20 supports a segmented permanent magnet 84 in spaced-apart circumferential relation about the exterior of a non-magnetic cylindrical housing 88 in which the drive shaft 46 is journalled. Within the cylindrical housing 88, a magnetic hollow cylinder 90 encompasses and is fixed to an adapter sleeve 92 coaxial with and fixedly coupled to the center shaft 46, being held in fixed rotational position by a radial coupling pin (not shown in detail). The outer permanent magnet 84 and the inner magnetic structure 90 have opposed surfaces of opposite magnetic polarity that are magnetically coupled through the intervening housing 88 wall. Those skilled in the art will recognize that a number of combinations of continuous or segmented permanent magnet or magnetic structures are feasible as long as adequately magnetic coupling force is achieved. The outer permanent magnet 84 in this example comprises a single magnetic cylinder having an odd number of pole pairs (here three) spaced about its circumference. The magnetic coupling between the outer permanent magnet 84 and the inner magnetic structure 90 is sufficiently strong to maintain a firm coupling under all conditions of operation. The magnetic drive permits full sealing of all of the interior portions of the system against air leakage. At the opposite end of the motor 20, an identical magnetic drive system is arranged coaxial with the opposite motor drive shaft 94, to drive a positive displacement gear pump acting as a suction pump 22 for the system. Inasmuch as the arrangement is the same, it need not be shown or described in corresponding detail.

In the operation of the system, with a substantial suction (e.g. more than approximately 20 inches Hg) being drawn within the upper region of the settling chamber 12 and in the center portion of the toroidal chamber 51 through the conduits 58, 59, water is fed from the inlet throat 32 into the center region of the toroidal chamber 51, as the impeller 56 and the centrifugal pump 54 are rotated at 1725 rpm. When initially loading the system, the float valve 28 is low and the valve member 40 maintains the aperture at the inlet throat 32 fully open. Once the selected maintenance level is reached, the float valve 28 adjusts the valve member 40 so that the tip 41 controls inlet flow so as to maintain liquid intake substantially constant. The input tap water has a substantial gas concentration in both entrained and dissolved form.

At the metering valve member 40, the water pressure is suddenly reduced as the water is subjected to the interior suction within the system. This sudden reduction expands and releases the entrained air, and as the water is metered into the inlet manifold 34, it forms a thin conical spray about the valve member 40 which greatly increases the surface area and releases a significant percentage of dissolved gas.

Within the toroidal chamber 51, the inlet flow encounters the spinning impeller 56 and while in contact with the impeller surface is forced outwardly by centrifugal force toward the impeller blades, and then into the annular outer portion of the chamber 51. The inlet flow is injected into the manifold and goes downward into the flow helix, whereas the gas, having a lower density, tends to disperse and to be drawn off at the suction conduit 59. This gravity separation removes a substantial proportion of the released gases, and the liquid then enters the helical motion in which its surface area is greatly expanded. It will be noted that the liquid is impelled both radially outwardly by the movement of the impeller, and centrifugally about the central axis of the impeller 56. When the liquid reaches the annular boundary of the chamber 51, however, centrifugal force is reduced as the liquid velocity is reduced. The liquid is then in contact with the wall of the chamber, and as seen in FIG. 7, and in FIG. 3, turns around and back toward the central axis of the impeller 56. Thus it is directed radially inwardly relative to the central axis and then against the broad face and the blades of the impeller 56. At the same time, the liquid is constantly impelled circumferentially, so that the flow increments generally follow a helical path about the toroidal chamber 51. The liquid forms a high surface area toroid or annulus, and undergoes a vortex action about the center of the toroid such that cavitation is induced. As is known, the introduction of this turbulence under a significant vacuum at the interior outlet 59 causes substantial degassing of the liquid due to cavitation. The toroidal chamber 51, however, is unique in effecting both a continuous degasification and in providing an extremely high area-to-water volume relationship without tending to extract liquid from the suction line 59. The combination of the velocity of the liquid, which further reduces the internal or dynamic pressure of the liquid, high surface area, low static pressure and cavitation result in rapid removal of gas from the fluid to the 1 ppm level. At this point, the gas is entrained as micro- and macro-bubbles in the helical flow. The flow action also is a continuous one which does not present a danger of self-blocking against further inlet flow.

Thus, when water is forced out of the periphery of the toroidal chamber 51 into the conduit 62 at its bottom region, and carried into the bottom of the settling chamber 12, there has been substantial separation of gas from the water. The undissolved gas components are extracted in the settling chamber 12, in which the contained gases rise under gravity to be withdrawn via the suction line 58. The flow into the settling chamber 12 is on the far side from the pump chamber 50, and the rising bubbles are further dispersed outwardly from the pump chamber 50 by the lower baffle plate 26, which may have a depending skirt acting as a barrier to flow in directions toward the pump chamber 50. The rising bubbles thus do not move in the direction of the interconnecting flow aperture 64 which leads from the settling chamber 12 into the centrifugal pump chamber 50. However, the water in the settling chamber 12 is free to move through the flow aperture 64 under the influence of gravitational forces, there being no differential pressure in the chamber 50 due to the negative pressure balance established by the suction aperture 66 at a level above the water level. In the pump chamber 50 the centrifugal pump 54 forces the water outwardly to a radius outside the suction aperture 66, from the pump chamber 50 via the liquid conduit 68. The outward flow thus initiated overcomes the suction in the pump chamber 50, and the liquid is thereafter subjected to the positive pumping action of the gear pump 70. The centrifugal pump, it will be noted, is disposed on a horizontal axis and spans both the lower inlet conduit 64 for liquid and upper conduit 66 for suction. Thus even through the pump chamber 50 is under suction at its upper side gravity feed into the centrifugal pump 54 insures a continuous motion of the liquid toward the positive gear pump 70. It can be seen that the pump 54 therefore is in actuality gravity fed from the settling chamber, and serves primarily as a supercharger for the gear pump 70, which does the substantial majority of the work involved in removing the liquid and returning it to ambient pressure. With the rotation of the centrifugal pump in a vertical plane, the disposition of the vertically separated flow aperture 64 and suction aperture 66 provide a ready and convenient means of gas removal from the liquid at this point.

The pumping force exerted by the centrifugal pump 54 against suction is relatively low, but it is not desirable to exert undue pumping force with the gear pump 70. Thus the recirculation conduit 72 and the pressure relief valve 74 are disposed to limit the positive pump action. If the outlet pressure of the gear pump 70 becomes too high the pressure relief valve 74 opens and water is recirculated so that the net outlet flow, and the extraction rate from the pump chamber 50, are limited to predetermined levels. The liquid is thereby repressurized to ambient pressure. The presence of the one-way valve 71 in this flow path insures against loss of suction in the system via this path. The one-way valve 60 in the suction line performs a similar function, in that it opens only in response to a greater (i.e. more negative) negative pressure or suction from the pump 22, and therefore guards against loss of the internal vacuum condition. Such factors are of particular importance during start-up operations.

The magnetic coupling provided between the drive shaft 46 and the motor 20 drive shaft 82 contributes materially to consistent operation by providing a solid drive coupling without introduction of gas leakage. The magnet 84, mounted on the spider 80 that is directly connected to the motor drive shaft 82 are magnetically coupled to the magnetic cylinder 90 held in fixed relation to the free shaft 46 within the drive housing 16. By coupling the suction pump 22 to the second shaft 94 of the motor 20, a very compact and reliable unit results.

Although a number of different examples and variations have been described above, it will be appreciated that the invention is not limited thereto but includes all exemplifications and modifications falling within the scope of the appended claims.

What is claimed is:

1. A system for removing gases from a liquid stream on a continuous basis comprising:

means providing a liquid to be degassed;

means, including rotating impeller means rotating about a central axis and means for defining a chamber about the impeller means providing a hollow annular volume having an at least partially curvilinear cross section concentric with the central axis and extending about the periphery of the impeller means, the rotating impeller means receiving the liquid and centrifugally directing the liquid into a helical liquid flow with interior cavitation within the hollow annular volume as well as along the outer periphery, as the impeller means rotates;

settling chamber means coupled to receive liquid from the periphery of the hollow annular flow at a bottom region thereof;

means coupled to said settling chamber means and to said chamber about the impeller means for maintaining low gas pressures therein to remove gases from both of said means; and means coupled to said settling chamber means for extracting liquid therefrom.

2. The invention as set forth in claim 1 above, including in addition means initially receiving the liquid to be degassed for providing the liquid in a high surface area spray under low pressure.

3. The method of continually degasifying a liquid comprising the steps of:

centrifugally inducing a toroidal vortex flow pattern about and along an axis circumferential to a central axis with internal cavitation at the circumferential axis while drawing a suction interior to the toroidal flow to provide a first extraction of gases;

withdrawing liquid from the periphery of the toroidal flow;

storing a volume of the withdrawn liquid;

drawing off entrapped gases from the withdrawn liquid under suction to provide a second extraction of gases; and removing the degasified liquid from the volume under suction.

4. The method as set forth in claim 3 above, including in addition the steps of initially subjecting a high surface area flow of the liquid to a suction and gravity separating the liquid from the gas.

5. The method as set forth in claim 3 above, wherein the step of removing the degasified liquid comprises the steps of first centrifugally pumping the liquid under gravity feed and then subjecting the liquid to a positive pumping action.

6. The method as set forth in claim 3 above, wherein the step of inducing a toroidal flow includes providing a high surface area flow within a confined volume.

7. A liquid degasifier comprising:

first chamber means defining a large area toroidal surface of concave curvilinear outer cross section, the first chamber means including continually rotating impeller means receiving a liquid to be degasified and centrifugally accelerating the liquid toward the toroidal surface, the liquid flowing over the toroidal surface in a helical motion with internal cavitation while moving along the length of the toroidal surface;

second chamber means coupled to receive liquid from the selected peripheral portion of said first chamber means, said second chamber means including means for containing a substantial body of said liquid while providing an associated adjacent volume for receiving gases; and means coupled to said first and second chamber means for establishing a negative pressure therein comprising suction means coupled to said first chamber means in a region other than said selected peripheral portion and coupled to said second chamber means in said associated adjacent volume.

8. The invention as set forth in claim 7 above, wherein said second chamber means comprises liquid settling chamber means having a lower liquid receiving region and an upper negative pressure region in communication therewith and wherein said degasifier includes means for supplying liquid from said first chamber means into a lowermost portion of said second chamber means.

9. The invention as set forth in claim 7 above, wherein said system further includes means coupled to said first chamber means for injecting said liquid as a high surface area spray into said first chamber means.

10. A liquid degasifier comprising:

first chamber means defining a large area toroidal surface of concave curvilinear cross section, the first chamber means including continually rotating impeller means receiving a liquid to be degasified and centrifugally accelerating the liquid toward the toroidal surface, the liquid flowing over the toroidal surface in a helical motion with internal cavitation while moving along the length of the toroidal surface;

second chamber means coupled to receive liquid from the selected peripheral portion of said first chamber means, said second chamber means including means for containing a substantial body of said liquid while providing an associated adjacent volume for receiving gases;

means coupled to said first and second chamber means for establishing a negative pressure therein comprising suction means coupled to said first chamber means in a region other than said selected peripheral portion and coupled to said second chamber means in said associated adjacent volume; and centrifugal pump means disposed adjacent said settling chamber means and including liquid coupling means and gas coupling means coupling the lower liquid receiving region and upper negative pressure region of said settling chamber means to different parts of said centrifugal pump means.

11. A water degasifier system comprising:

housing means defining a toroidal chamber, a pump chamber and a settling chamber disposed along a selected axis in serial fashion, said toroidal chamber having a toroidal periphery concentric with the central axis and an interior radial portion, said pump chamber having a periphery concentric with the central axis, said settling chamber defining an inferior liquid receiving volume and a superior gas confining volume in communication therewith;

an impeller pump disposed in said toroidal chamber and rotatable about the central axis including peripheral vane means registering within the toroidal periphery;

a centrifugal pump disposed within said pump chamber and rotatable about the central axis;

drive means coupled to said impeller pump and centrifugal pump for rotating said pumps about said central axis at speeds sufficient to exert substantial centrifugal force on water in the associated chamber;

first conduit means for feeding inlet water into communication with the interior radial portion of said toroidal chamber;

second conduit means for coupling water from the toroidal periphery of the toroidal chamber into the lowermost portion of the liquid receiving volume of said settling chamber;

third conduit means for coupling water from the liquid receiving volume of said settling chamber;

fourth conduit means for providing communication for gases between the gas confining volume of said settling chamber and a centrally disposed portion of said pump chamber; and suction means coupled to the gas confining volume of said toroidal chamber and the interior radial portion of said toroidal chamber.

12. The system as set forth in claim 11 above, wherein said housing means includes first common wall means separating said toroidal chamber and said pump chamber, and second common wall means separating said pump chamber and said settling chamber, and wherein said drive means includes drive shaft means along the central axis and coupled to both the impeller pump and centrifugal pump.

13. The system as set forth in claim 12 above, wherein said third and fourth conduit means comprise means defining apertures in said second common wall means.

14. The system as set forth in claim 11 above, wherein said system includes flow control means receiving the inlet water flow and controlling the rate of flow into the toroidal chamber in accordance with the level of water in the settling chamber, and wherein said first conduit means directs a spray of liquid into the toroidal chamber.

15. The system as set forth in claim 14 above, wherein said flow control means comprises float means disposed in the settling chamber and valve means coupled and responsive to the position of said float means.

16. The system as set forth in claim 14 above, wherein said second conduit means coupled water into said settling chamber means at a spaced apart region from said third and fourth conduit means and including in addition baffle means disposed within the liquid receiving volume for blocking the flow of rising bubbles from the second conduit means from the direction of said third and fourth conduit means.

17. The system as set forth in claim 11 above, including in addition positive displacement pump means and conduit means coupling the outer periphery of the pump chamber to the positive displacement pump means.

18. The system as set forth in claim 17 above, wherein said positive displacement pump means comprises gear means driven by said drive means, and including in addition pressure relief means intercoupling the outlet and inlet of said positive displacement pump means.

19. The system as set forth in claim 17 above, wherein said drive means comprises a rotor having at least one drive shaft, shaft means coupled to said impeller pump and centrifugal pump and disposed along the central axis, and magnetic coupling means coupling said motor to said shaft means for rotation thereof.

20. The system as set forth in claim 19 above, wherein said motor comprises a double ended motor having opositely directed drive shafts, and wherein said suction means comprises a suction pump coupled to the second of said motor drive shafts.

21. The system as set forth in claim 20 above, wherein said drive means further includes means magnetically coupling the second of said motor drive means to said suction pump means.

22. The method of degassing a liquid comprising the steps of:

spraying the liquid under low pressure conditions to release dissolved gas;

gravity separating the released gas from the liquid;

cavitating the liquid under centrifugal force in an annular flow of high surface area extending circumferentially along an arc through a full 360° about a central axis, and concurrently rotating the annular liquid flow about the central axis while maintaining low pressure conditions to provide a first degassing;

settling a volume of the liquid after cavitation;

gravity separating further gases from the liquid under low pressure conditions subsequent to cavitation to provide a second degassing; and repressurizing the liquid to ambient pressure.

23. The method as set forth in claim 22 above, wherein the cavitating flow follows a helical path about an axis circumferential to the central axis with gases being withdrawn from an interior region of the circumferential axis.

* * * * *